US008291252B2

(12) United States Patent
Mattice et al.

(10) Patent No.: US 8,291,252 B2
(45) Date of Patent: Oct. 16, 2012

(54) POWER MANAGEMENT IN A MULTI-STATION GAMING MACHINE

(75) Inventors: Harold E. Mattice, Gardnerville, NV (US); James W. Stockdale, Clio, CA (US); Richard L. Wilder, Sparks, NV (US); Michael P. Khamis, Reno, NV (US)

(73) Assignee: IGT, Reno, NV (US)

( * ) Notice: Subject to any disclaimer, the term of this patent is extended or adjusted under 35 U.S.C. 154(b) by 1085 days.

(21) Appl. No.: 12/199,663

(22) Filed: Aug. 27, 2008

(65) Prior Publication Data

US 2010/0056278 A1 Mar. 4, 2010

(51) Int. Cl.
*G06F 1/00* (2006.01)

(52) U.S. Cl. ........ 713/330; 713/300; 713/340; 323/276; 323/277

(58) Field of Classification Search .................. 713/330, 713/300, 340; 323/276, 277
See application file for complete search history.

(56) References Cited

U.S. PATENT DOCUMENTS

| | | | | |
|---|---|---|---|---|
| 5,673,412 | A * | 9/1997 | Kamo et al. | 711/114 |
| 6,966,006 | B2 * | 11/2005 | Pacheco et al. | 713/300 |
| 7,123,829 | B2 * | 10/2006 | Ohsuga | 396/301 |
| 7,283,738 | B2 * | 10/2007 | Ohsuga | 396/303 |
| 7,370,220 | B1 * | 5/2008 | Nguyen et al. | 713/330 |
| 7,406,614 | B2 * | 7/2008 | Peleg et al. | 713/320 |
| 7,552,351 | B2 * | 6/2009 | Chang | 713/330 |
| 8,037,329 | B2 * | 10/2011 | Leech et al. | 713/320 |
| 2001/0008018 | A1 * | 7/2001 | Kamo et al. | 713/330 |
| 2004/0107313 | A1 * | 6/2004 | Kamo et al. | 711/114 |
| 2007/0220293 | A1 * | 9/2007 | Takase | 713/320 |

FOREIGN PATENT DOCUMENTS

WO WO2007/014135 2/2007

* cited by examiner

*Primary Examiner* — Jaweed A Abbaszadeh
(74) *Attorney, Agent, or Firm* — Weaver Austin Villeneuve & Sampson LLP

(57) ABSTRACT

Gaming machines and related methods for controlling and managing electrical current to peripheral devices in a gaming machine are described. A gaming machine having multiple high-current peripheral devices drawing power from a single power supply within the gaming machine is able to regulate the timing at which the peripherals may receive power. The gaming machine may be a multi-station gaming machine, such as a gaming table, where each station has various standard peripheral devices. The gaming machine determines whether the power required by the peripherals at any given time will exceed a threshold current supply and, if so, delays the operation of one of the peripherals to regulate the amount of current the power supply has to supply at any given time. Current usage and time overlaps of two or more peripheral devices are determined using current profiles of the devices. A current profile contains time-related data and current usage data that are utilized in determining total current usage during operational overlaps between two or more peripheral devices in the gaming machine. A peripheral device is provided with current when it is determined that the total current supplied does not exceed a maximum efficient current output of the power supply.

28 Claims, 6 Drawing Sheets

POWER MANAGEMENT IN A MULTI-STATION GAMING MACHINE

BACKGROUND OF THE INVENTION

1. Field of the Invention

The present invention relates to wager gaming machines. More specifically, it relates to managing electrical current usage by peripheral devices in a gaming machine.

2. Description of the Related Art

An increasingly complex issue arising with multi-station gaming machines, such as gaming tables, which have peripheral components at each player station is power management. A player station at a gaming table typically has multiple peripheral devices, as would a single-player or conventional gaming machine, including a card reader, a ticket printer, bill acceptor, coin hopper, and the like. Thus, a six-player gaming table may have to control and provide power to 24 or more high-current peripheral devices, in addition to providing power for standard gaming table operations. For example, five players may insert cards, bills, or tickets at close to the same time. If performance or time to the player is not a concern, one device may be enabled at a time (i.e., a first come, first serve approach). However, this method may have a negative impact on player performance.

If the power supply in a multi-station gaming machine is not designed to handle high demands on power, peripheral devices may become unpredictable, which is a very undesirable scenario in a gaming environment. In other situations, an overload on power may cause the power supply to reset and data may be lost. The gaming table may also go into "over-current" mode, recovery mode or have an overload shutdown.

If power in a multi-station gaming machine is not managed to somehow avoid overloads using internal logic and intelligence, the power supply would likely have an unwieldy and impracticable design (e.g., to accommodate extra margin for high demands?). As a result it would be difficult and more costly for casinos to install. For example, it may require 14# and 16# gauge wiring, special circuits, and generally, a more complex and higher capacity power supply. In addition it may also be harder to manage too large for connectors used in gaming machine power supplies.

SUMMARY OF THE DESCRIBED EMBODIMENTS

Gaming machines and methods for controlling and managing electrical current to peripheral devices in a gaming machine are described. A gaming machine having multiple high-current peripheral devices drawing power from a single power supply within the gaming machine is able to regulate the timing at which the peripherals receive power. The gaming machine may be a multi-station gaming machine, such as a gaming table, where each station has various standard peripheral devices. The gaming machine determines whether the power required by the peripherals at any given time will exceed a threshold current supply and, if so, may delay the operation of one of the peripherals to regulate the amount of current the power supply must provide at any given time. Current (electrical) usage and time overlaps of two or more peripheral devices may be determined using current profiles of the devices. A current profile may contain time-related data and current usage data that are utilized in determining total current usage during operational overlaps between two or more peripheral devices in the gaming machine. A peripheral device is provided with current when it is determined that the total current supplied does not exceed a maximum efficient current output of the power supply.

One embodiment is a method of controlling electrical current to peripherals in a multi-station gaming machine having a power supply. A command is received to initiate an operation having an operating time on one peripheral in the gaming machine. Electrical current may be provided to the peripheral in response to receiving the first command, thereby powering the peripheral. Another command is received to initiate another operation on another peripheral also having an operating time in the gaming machine. It may then be determined whether a combined electrical current requirement at a given time within a time intersection of the two operating times exceeds an upper threshold electrical current of the power supply. The combined electrical current requirement may be the sum of the two peripheral current requirements at the given time. A delay time period may then be calculated when the upper threshold electrical current is exceeded. The supply of electrical current may then be delayed to the second peripheral by the delay time period, thereby regulating operation of the second peripheral, and wherein the power supply is prevented from supplying electrical current above a power supply maximum current.

Another embodiment is a multi-station gaming machine having a master gaming controller, a power supply, multiple peripheral devices, and a memory storing multiple peripheral device current profiles. A peripheral device may perform one or more operations, an operation having one or more tasks, wherein the peripheral devices are connected to the power supply and to the master gaming controller. The memory may also store one or more peripheral device current profiles, wherein a current profile may contain time data and current data. The time data may indicate time intervals when current usage is constant within an operational time of a peripheral device and the current data may indicate a current usage of the peripheral device during the time intervals. In one embodiment, a task performed in the peripheral device may be placed in a wait state by the master gaming controller if the task would require that the power supply provide more than a threshold electrical current. In another embodiment, a control line from the master gaming controller to the peripheral devices may be utilized for enabling and disabling a peripheral device. In another embodiment, a power regulation logic module may control commands that are sent from the master gaming controller to the peripheral devices.

BRIEF DESCRIPTION OF THE DRAWINGS

References are made to the accompanying drawings, which form a part of the description and in which are shown, by way of illustration, particular embodiments.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In addition, well known process operations have not been described in detail in order to not unnecessarily obscure the present invention.

Methods and systems for managing power supply to high-current peripheral devices in a multi-player gaming machine without degrading the machine's performance to the player are described in the various figures. A multi-station or multi-player gaming machine (referred to herein as "gaming table") has a number of peripheral components that are used for interfacing with a player at each player station of the table. For example, the Mesa Gaming Table from IGT of Reno, Nev. allows for four players to play a common game or independent games.

Figure 1:
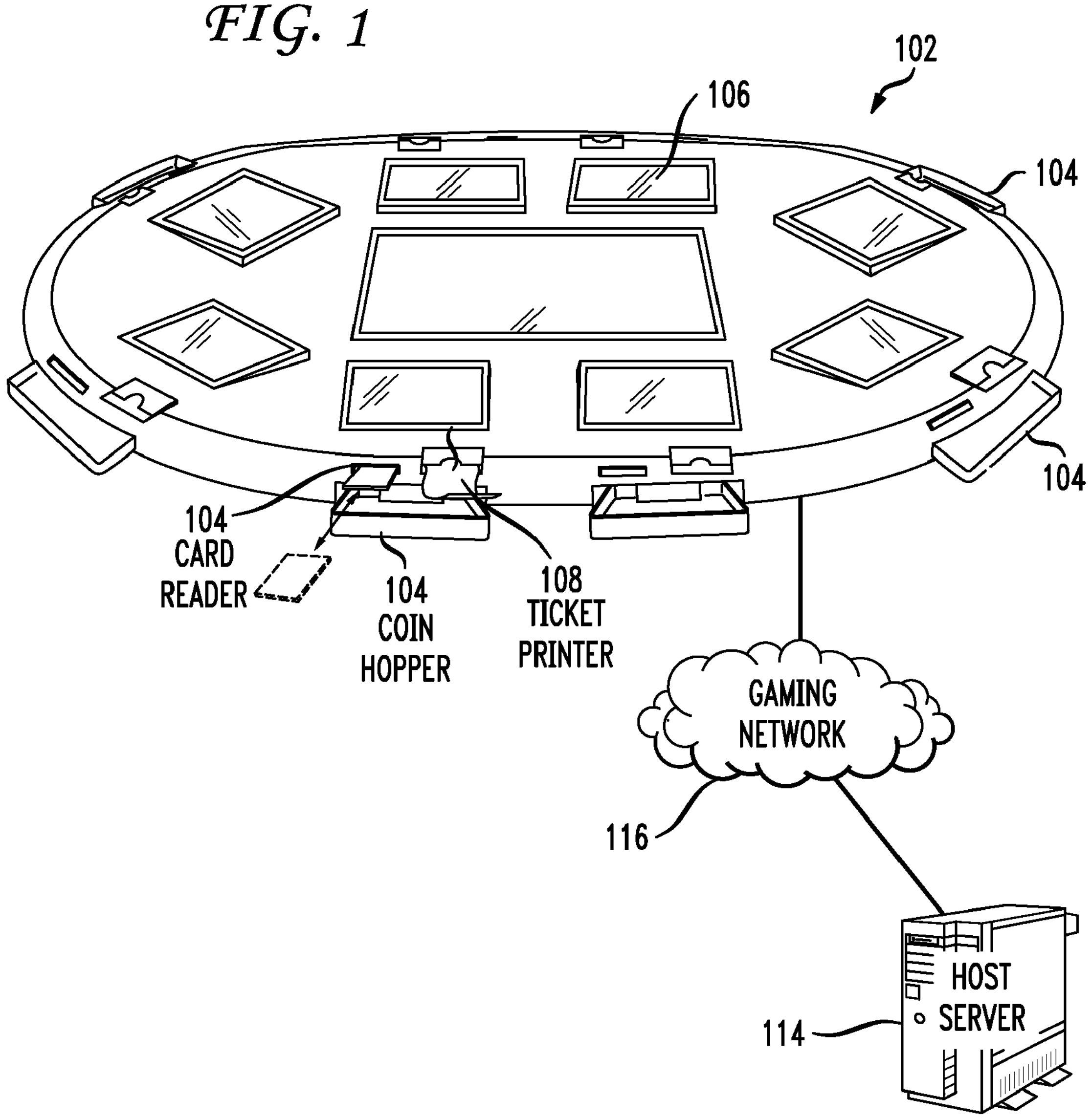
FIG. 1 is an illustration of a gaming table connected to a gaming network and highlighting peripheral devices at one player station.

Some conventional peripheral devices are shown in a sample 8-player gaming table in FIG. 1. A gaming table 102 has multiple player stations 104. A player station may have a primary display where game play data may be displayed to the player and multiple peripherals. Some stations may have more or fewer peripherals than other stations. In one embodiment, a player station has a ticket printer 108, a card reader 110, a coin hopper 112, a bill dispenser (not shown) and may have a player tracking card reader (not shown). Peripheral devices are operatively coupled to a common gaming machine CPU and common power supply. Additional peripherals such as rear projection systems, infrared touch systems, and sound systems may also be included. Each of these components and others require electrical power to operate in addition to the electrical power needed by the gaming table to perform standard operations. These power requirements are described in greater detail below.

Gaming table 102 is connected to a host server 114 via gaming network 116. Host server 114 may be used by gaming table 102 to download current (power) data relating to peripherals as described below. In other embodiments, table 102 may be a stand-alone gaming table with no network connection. Table 102 may be described as a gaming machine maintaining eight game play state machines (one for each player station) and a ninth state machine for controlling power to all the high-current peripherals devices. It is the data, processes, and hardware needed for implementing this power supply state machine that is described in the figures below.

It is helpful to first describe power-related data that may be used by a gaming table CPU to implement the processes described. As noted, a player station has a number of peripheral devices for player interaction. From a player's perspective, a peripheral device typically performs one or more functions. For example, a bill acceptor has the primary function of accepting a bill from the player. Another function may be rejecting a bill that the player has inserted. A ticket printer may have two primary functions: outputting a ticket to a player and accepting a ticket from a player. A card reader has the primary function of accepting a card inserted by the player and dispensing a card. Each of these is typically comprised of one or more operations, wherein an operation is comprised of a sequence of tasks, a task being a discrete step within the peripheral that is performed in order to implement an operation, thereby exhibiting a specific function to the player. For example, when a player inserts a card, the card is accepted, stacked, erased, and so on. Or when a player cashes out, a ticket is printed and dispensed.

A peripheral device may have a power specification provided by its manufacturer. Such a document may state the maximum power (e.g., 6 amps, 15 amps, etc.) that the device requires and the minimum power (e.g., 0.4 amps) it draws when it is not performing any operation (i.e., when it is in a wait state or idle state). The specification may also provide the amount of time required to complete an operation or tasks comprising the operation. If this information is not provided in a power specification, it may be derived by a gaming table manufacturer or operator by having the CPU perform profiling tests known in the art on the devices to determine their power requirements.

Figure 2:
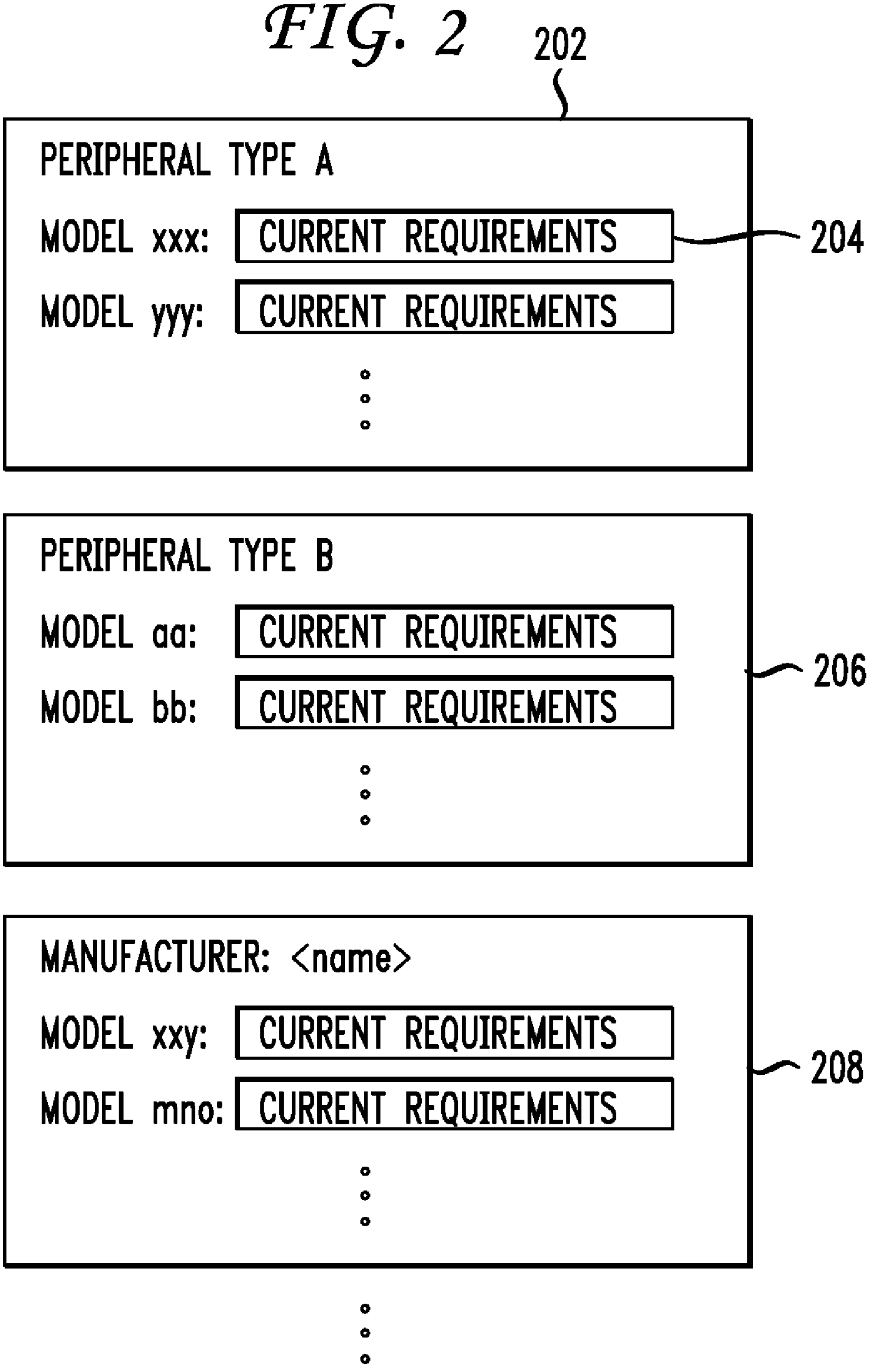
FIG. 2 is a block diagram of one arrangement of current profile data in accordance with one embodiment.
Figure 3A:
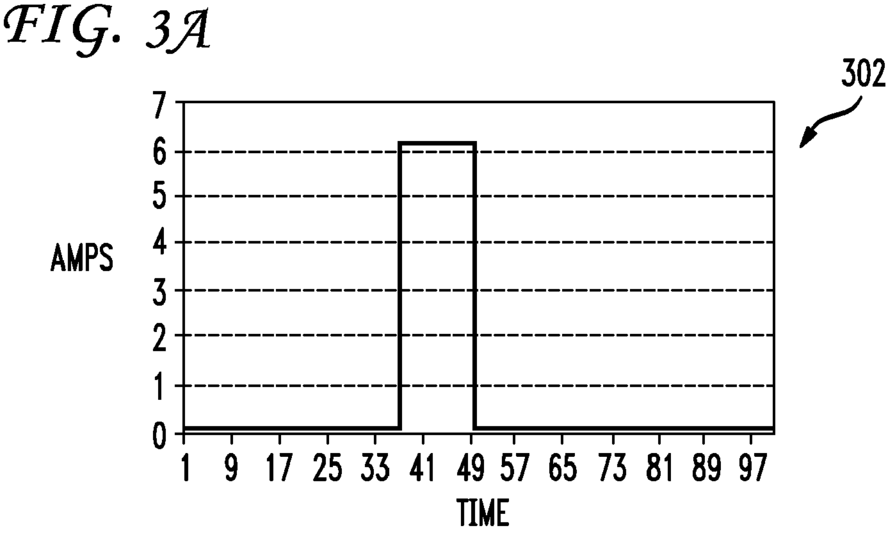
FIGS. 3A to 3D are graph diagrams showing sample current requirements of some conventional peripheral devices that may be used at a gaming table.
Figure 3B:
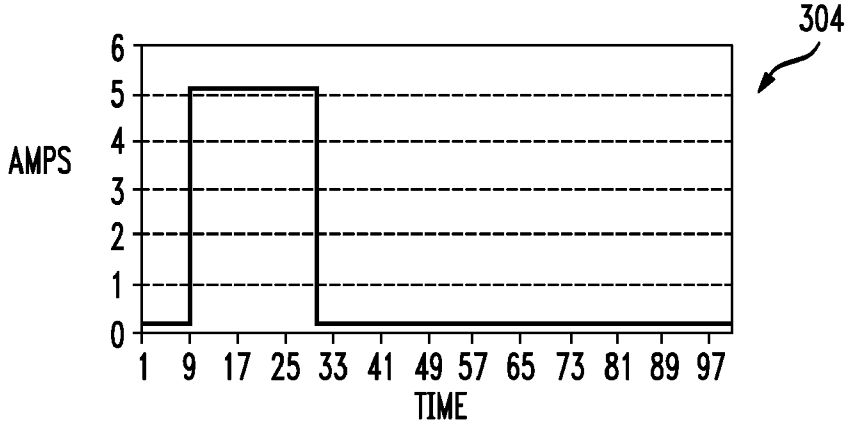
Figure 3C:
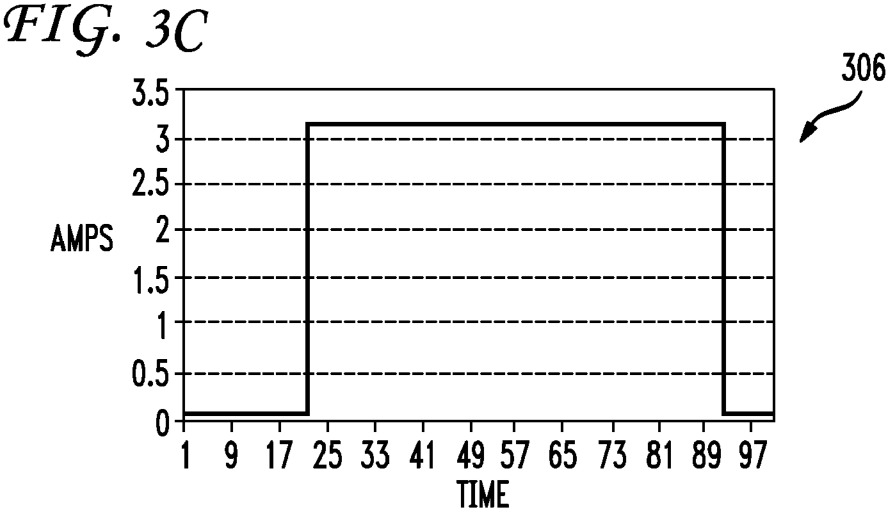
Figure 3D:
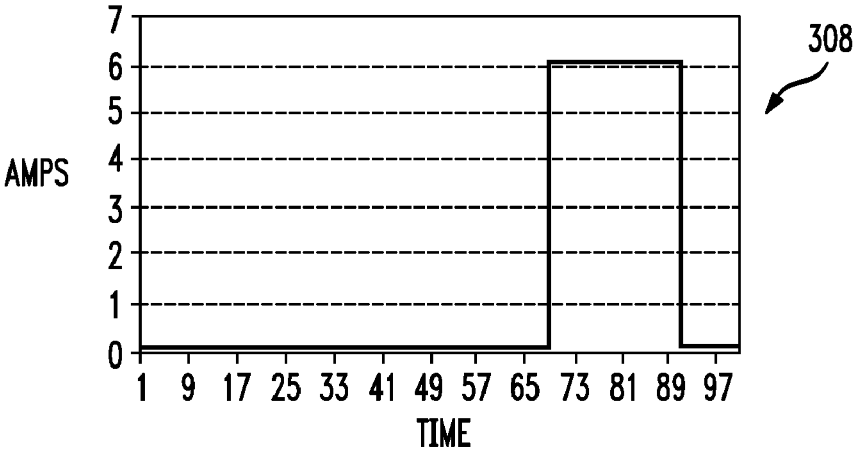

Returning to the data that may be used by gaming table 102, FIG. 2 is a block diagram of one arrangement of current requirement data in one embodiment. How this data is derived and where it is stored may vary in different embodiments. In one embodiment, current (or power) data is configured according to generic peripheral type, such as card reader or bill acceptor/validator. For each peripheral type, there may be one or more suppliers/manufactures, each providing different models. For example, a gaming operator/casino may use five different models of card readers in its gaming machines and tables, three from one manufacturer and two from another. An example of a card reader is the Rewritable Data Card (RDC) Printer, Model DUC-400, from JCM-America. Each model may have a slightly different power requirement. Using data tables to describe the data, one table, comprised of records, may be for bill acceptors and the unique identifier for each record in the table is a specific bill acceptor model number. The fields in the record may contain specific data relating to the power requirements for that particular bill acceptor model. This is shown in logical blocks 202 and 204. In one embodiment, this data may be stored in what may be described as a power requirement configuration card.

Current data may also be configured based on manufacturer as shown in table 206. Table 206 contains current data for all peripheral devices from a specific manufacturer. In a data table format, each record in the database may be uniquely identified by model number and may include records for various types of peripheral devices or just one type. Current data may be arranged in the same manner as in the example peripheral device table described above. A person skilled in the art will recognize that various other data arrangements may be used to store current data for the peripherals. For example, the data may be stored in a simple alphabetical listing using model number.

Current requirement data 208 for a device may be arranged at the operational level. In this embodiment, which maybe described as the least granular implementation, data 208 may consist of the maximum current required for an operation and total operational time. For example, current requirement may be stated simply as (9, 5) indicating a maximum current requirement of nine amps and complete operational time of five seconds. In another embodiment, current requirement data 208 may be arranged at a more granular level, such as according to specific task within an operation. For example, for the operation of accepting a card, the data may be arranged such as: t(0-39):0.3; t(40-50):6.4; t(51-100):0.3 or some variation thereof. For each peripheral, each operation may require a specific amount of time and each task within the operation takes a specific amount of time. In this example, the CPU is informed that the device will draw 0.3 amps from 0 to 39 time units (e.g., clock cycles) (zero being the time the CPU sends the command to print), 6.4 amps from 40 to 50 time units (the time to erase the card) and 0.3 amps from 51 to 100 seconds. In another example, for the operation of printing data to a card, if a print command is received at the RDC reader at time 0, the number of amps required by the reader is 0.3 until time 39. A time 40 the erase task starts, and the number of amps jumps to 6.4 and remains there until time 50. From time 51 to time 100 the number of amps required by the reader drops back to 0.3 amps while the reader communicates with the gaming table CPU. A person of skill in the art will recognize that there are many ways this data may be arranged to facilitate use by a CPU.

Current profiles or data may be loaded onto the gaming table in various ways. In one embodiment the current profiles are transmitted from a host server in the gaming network to the gaming table. The host server may store current data for all peripheral devices used by various gaming tables and machines in the casino. As described above, this data consists primarily of time and current (amp) values and, thus, is not likely to be voluminous. It may be stored in any suitable form, such as in flat files, database files, and the like. The data may be transmitted over the gaming network or may be stored on a portable memory device, such as a USB memory device or Firewire device, and physically taken to the gaming table and inserted into an appropriate port by an authorized casino employee. In another embodiment, the current profiles are stored on the gaming table CPU addressable memory during initial installation or manufacture of the table. When changes are made to the peripheral devices that require an update to the current data, this may be done at the gaming table using a portable memory device or other suitable means. In another embodiment, the current data may be provided to the gaming table CPU by the peripheral device itself in cases where the manufacturer of the device electronically stores this type of data in the peripheral's memory. Generally, current profile data does not need to be stored in secured memory or persistent memory; it does not need to be recoverable given that it can be restored using external sources. The current data for all peripheral devices used in the casino may be stored on a host server as a back up or even printed on paper.

FIGS. 3A to 3D are graphs showing sample current requirements of some conventional peripheral devices that may be used at a gaming table. Each peripheral may have a peak current requirement that lasts for a set amount of time. More generically, a device may perform an operation that takes x amount of time (e.g., time from when the device receives a command to perform the operation to the time the device is done communicating completion of the operation to the CPU) and has y number of tasks to complete the operation. Each task may have a current requirement. The task with the highest current requirement may be used as the general power requirement of the device in the least granular current requirement implementation. For example, with the RDC reader in 302, the reader may be said to have a current requirement of 6.4 amps, without reference to the specific portion of time within the whole operation of when the device requires 6.4 amps. In this case the power requirement is defined for the whole operation without reference to specific tasks. In another embodiment, the power requirement for each task within the operation is provided. These two modes of describing the power requirements for a device are relevant to the methods for power management described below. In other embodiment, there may be other modes or ways of describing the power requirement for a device. In graph 304 the maximum current is a little over 5 amps and is required between 9 and 30 time units. In graph 306, for a coin hopper, 3.1 amps are required between 20 and 90 time units. In graph 308 for a card reader, 5.9 amps are needed between 70 and 90 time units.

Figure 4:
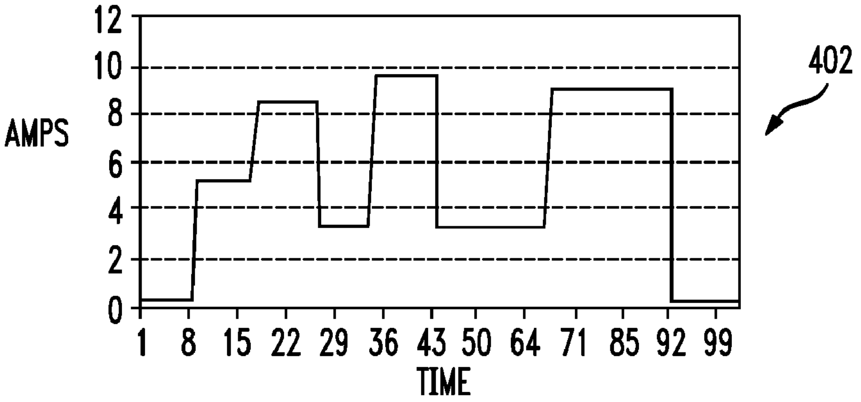
FIG. 4 is a graph diagram showing demand on a power supply if four sample peripheral devices at a single player station were started at the same time.
Figure 5:
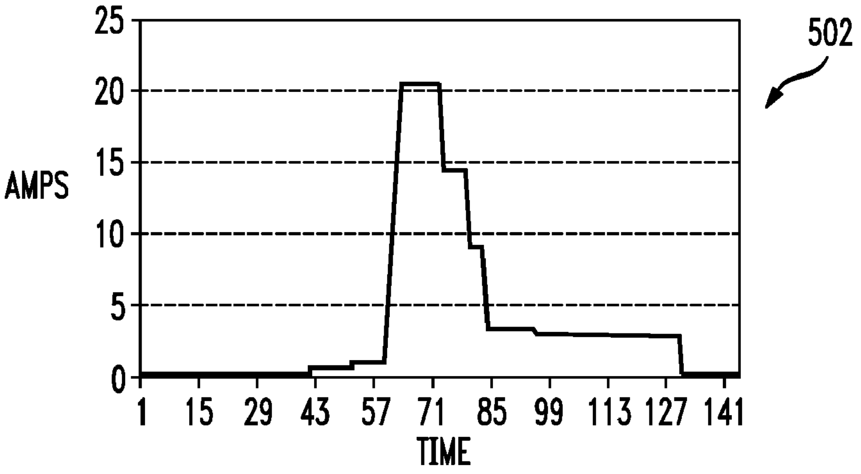
FIG. 5 is a graph diagram showing a "worst case" scenario where four sample peripheral devices are turned on in a sequence that draws the maximum amount of current from the power supply.

Problems may arise when high-current peripheral devices at each player station of the gaming table are started at close to the same time. For example, a group of five players approach a table at the same time and three insert player tracking cards, one inserts a ticket, and another inserts a bill. In this scenario, the cumulative power requirements for all devices may cause a sudden current demand ("spike") that the gaming table power supply may not be able to handle, at least not efficiently, and may cause a shutdown, reset, overload, or unpredictable behavior of the devices. As an example, if all four of the peripherals of a single player station started at the same time, that is, each received a command from the CPU to perform their operations at the same time, the demand on the power supply would be that of graph 402 of FIG. 4. There are three time intervals where the current requirement exceeds 8 amps: 20 to 30 time units, 40 to 50, and 70 to 90. If the power supply of the gaming table is 22 amps and standard table operation requires 16, leaving 6 amps for peripherals, power required in this scenario exceeds the power that may be supplied efficiently from the power supply (efficiency is discussed in further detail below). FIG. 5 is a graph 502 showing a "worst case" scenario where all the peripherals are turned on in a sequence that draws the maximum amount of current from the power supply. As can be seen from graph 502, the maximum current may be as high as 21 amps, exceeding efficient power supply by 15 amps and stays at this highly inefficient level for 10 time units.

Figure 6:
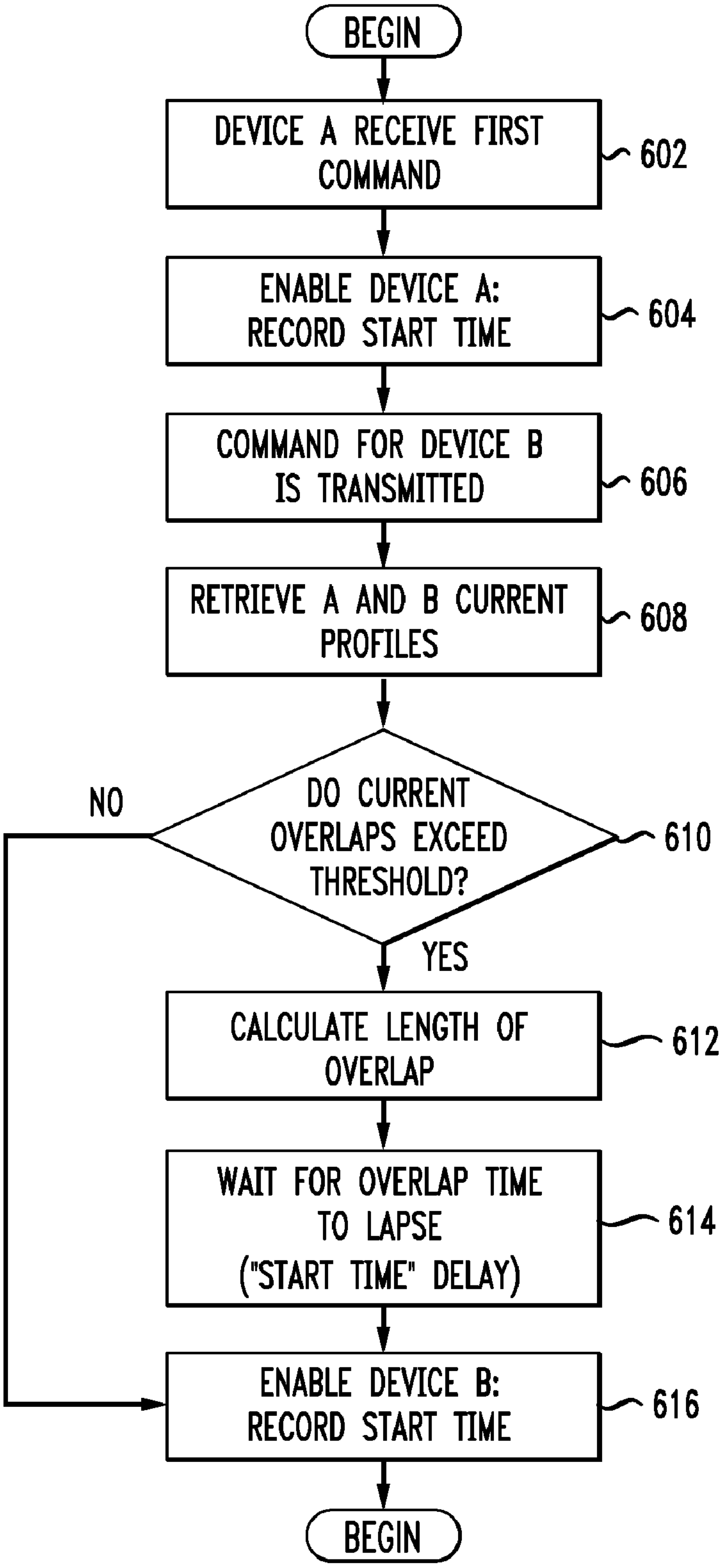
FIG. 6 is a flow diagram of a process for controlling supply of current to various peripheral devices while taking into account the power supply of the gaming table in accordance with one embodiment.

FIG. 6 is a flow diagram of a process for controlling supply of current to various peripheral devices while taking into account the power supply of the gaming table in accordance with one embodiment. At step 602 a peripheral (device A) receives a command to perform an operation. As described above, a peripheral typically must first receive a command before it will begin an operation (there may be a triggering event to initiate operation, such as card insert or a cash out). At step 604 the device is enabled and the operation begins. The CPU sets a timer when the operation starts or records the start time in some manner.

At step 606 a command to start an operation at another peripheral (device B) is transmitted from the CPU to the device. However, in one embodiment, the command is intercepted or delayed by software and not delivered to device B until certain calculations are performed. The time at which the command for device B was started may also be recorded by the CPU. At step 608 the system retrieves the current profiles for devices A and B. The current profiles, as described above, may be stored in a power configuration requirement card in the gaming table CPU addressable memory, in a network server (also in a power configuration requirement card) or in peripheral device memory. Once the current profiles have been retrieved at step 610, the system examines both profiles, taking into consideration the amount of elapsed time for device A (i.e., examining the start time of device A) to determine whether combined current requirements during operational overlaps between the two devices will at anytime exceed a threshold current supply of the gaming table. For example, the calculation may be: if device B was enabled now or at a specific time (e.g., three clock cycles from now), would the cumulative current requirement at any time during the operation of the two devices cause the gaming table power supply to exceed a certain threshold number of amps (e.g., 6 amps) where the number of amps is set based on a maximum efficiency capacity of the power supply.

In one embodiment, the most efficient capacity or threshold takes into account an efficiency curve of the power supply and specifically the most desirable range or "sweet spot" on the curve (e.g., 76% to 92%). As is known in the field, the power supplied may stray from this range, provided it returns within a relatively short time. Thus, is possible that it may provide 24 or 25 amps. In one embodiment, this calculation may be made by examining the power requirement configuration card to see the remaining current requirements for device A, specifically, the power needed for each of the remaining tasks in the sequence, when those tasks will start, and the length of time for each task. When implemented, the tasks may be irrelevant and all that is considered are the time intervals and number of amps. The power requirements for device B may then be examined in light of these requirements. That is, they are in a sense superimposed over the profile for device A, taking into account the starting time for device A, and the cumulative maximum power requirement for both devices is examined.

If at any time the cumulative power draw does not exceed the threshold number of amps, control goes to step 616 where the command to start operation on device B is transmitted or allowed to proceed, thereby enabling device B. As with device A, in one embodiment, the CPU sets a timer when device B begins operating. If it is determined that the cumulative power requirement will exceed the threshold number of amps, at step 612 the length of time of the overlap is calculated. This is done by using the time and current data provided in the current profiles. Once a time value of the threshold-exceeding overlap is calculated, the software waits for the time to pass or expire at step 614. In this manner, the CPU may effectively lock step the operation of device B based on task (i.e., sub-operation time intervals). If there are two or more time periods when the cumulative number of amps exceeds the threshold, in one embodiment, the software may wait for the last overlap time to expire. Once the wait time has passed, device B is enabled and a timer for device B is started by the CPU as described in step 616. The CPU may set individual timers for each peripheral device that goes through this process. The process may be applied to any number of devices. For example, if a command to start a third device is received, the current profile is retrieved and superimposed on top of the current requirement of devices A and B, taking into account the time those devices have been operating. The data entered would be similar to an array of data.

The process of FIG. 6 may not be able to accommodate simultaneous requests from devices, a potentially important issue for multi-station gaming machine. In one embodiment, devices may be assigned priorities so that conflicts arising from simultaneous requests may be resolved. A peripheral device is assigned a priority based on its importance relative to the other devices. For example, a bill validator or card reader (devices used for initiating game play) may have a higher priority than a coin hopper or ticket printer. Thus, if a four devices all require power at close to the same time and the power supply cannot support all of them, device priority may be used. Devices with higher priority are selected first to go through the process described in FIG. 6. In another embodiment, priority may not be used and the first device to receive a command proceeds first and is provided with power (a 'first come, first server' approach). The assignment of priority level to peripheral devices may be done when the gaming table first becomes operational and may be changed by modifying the software. In one embodiment, the priority level data may be stored in the current profile.

When a peripheral device is said to be "off" or disabled, it may typically be in one of two states. It may be placed in a wait state, for example, at step 614. By being in a wait state, the peripheral can operate immediately after being provided with power to perform the operation, but requires some amount of power while in a wait state. In another embodiment, the peripheral may be placed in an idle state, which does not require any or very little current. However, when in an idle state, the peripheral may need more time to power up and become operational when provided with current to proceed, for example, to step 616.

In one embodiment a peripheral device may be placed in a wait state or idle state using a specific software wait command or idle command issued from the gaming table CPU. A software module may be connected to the CPU and to each of the high-current peripheral devices and may be responsible for issuing wait or idle commands. In another embodiment there may be a hardware control line from the CPU to the devices such that when the control line is high, the peripheral device is provided current to perform the operation and when it is low, current for performing the operation is withheld until the delay time has passed. In another embodiment, transmission of operational commands from the CPU to the peripherals is simply delayed or held until the delay time has passed at which point the command to begin operation is transmitted to the peripheral.

Figure 7:
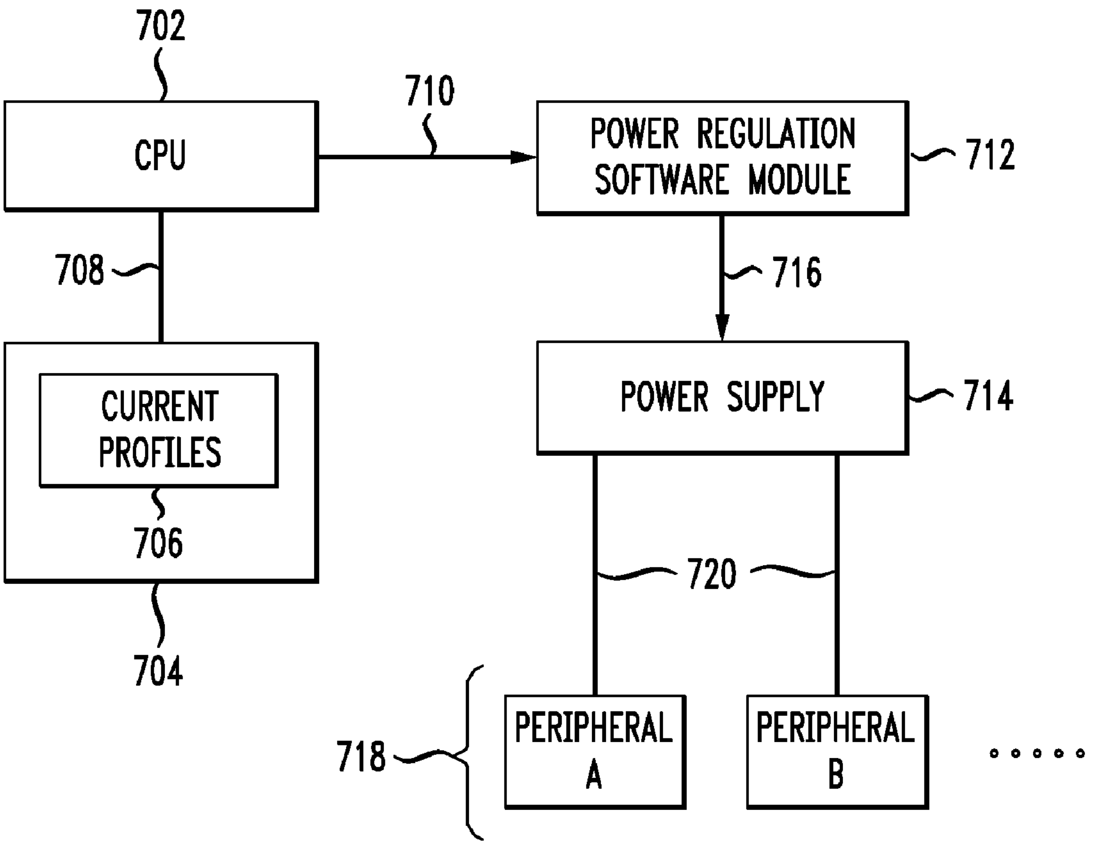
FIG. 7 is a logical block diagram showing relevant components of a multi-station gaming machine in accordance with one embodiment.

FIG. 7 is a logical block diagram of some relevant components of the hardware and software modules described above in the various embodiments. The configuration and connections shown in FIG. 7 is but one example of the configuration such components may have in a multi-station gaming machine. A CPU 702, also referred to as a master gaming controller, has access to local memory 704, which may be store some data that does not need to be stored persistently in the event of a machine failure. In one embodiment, it may be read-only memory. In other embodiments it may be random-access memory. Local CPU-addressable memory 704 stores current profiles 706 as described above. The profiles, which may be in the form of a power requirement configuration card, may be implemented as flat files, database files, or other appropriate form. Current profiles 706 may also be in different formats depending on the origin of the data. A bus 708 enables data transmission between CPU 702 and local memory 704.

In one embodiment, CPU 702 is connected via bus 710 to a power regulation software module 712 which contains logic for regulating commands sent to the peripheral devices from CPU 702. Logic implemented by module 712 may be the logic described in FIG. 6. In other embodiments other logic implementations may be encoded by software in module 712. In yet other embodiments, there may be firmware operating to control a power regulation chip or hardware component to control the power supply to the various peripherals. Software module 712 is connected to a conventional gaming machine power supply 714 via connection 716. Commands to power supply 714 to supply current to various peripheral devices

718 may be manipulated or controlled by power regulation software module 712 based on the outcome of the power regulation software. Various peripheral devices 718 are supplied power by power supply 714 via electrical connections 720. The actual amount of power supplied and the timing are derived using software in module 712 and current profiles 706. In other embodiments, there may be a control line from CPU 702 to power supply 714 or directly to various peripherals 718. In another embodiment, there may be a combination of direct control lines and software for regulating power to peripherals 718. There may be other connections or buses between components shown in FIG. 7 that are not shown.

Although illustrative embodiments and applications of this invention are shown and described herein, many variations and modifications are possible which remain within the concept, scope, and spirit of the invention, and these variations would become clear to those of ordinary skill in the art after perusal of this application. For example, current data has been described mainly in terms of time periods and current usage, however, other data may also be stored in current profiles that may be used in managing power in a gaming table. Although the power management techniques described are in the context of a multi-station gaming machine, such as a gaming table, the same principles may apply to regulating power at single player gaming machine, including portable gaming devices that may have high-current peripherals and limited or small power supplies. While the various embodiments have involved player-related peripheral devices, other types of components and devices that are not player oriented but use high amounts of current and are enabled and disabled on top of standard operation of the gaming machine may also be regulated using the methods described herein. Accordingly, the embodiments described are to be considered as illustrative and not restrictive, and the invention is not to be limited to the details given herein, but may be modified within the scope and equivalents of the appended claims.

What is claimed is:

1. A multi-station gaming machine comprising:

a master gaming controller;

a power supply; a memory; and a plurality of peripheral devices, wherein:

each peripheral device is configured to perform one or more operations, each operation including one or more tasks, the peripheral devices are electrically connected with the power supply and with the master gaming controller, the memory stores one or more peripheral device current profiles, each peripheral device current profile contains time data and current data, the time data indicates time intervals when current usage is constant within an operational time of a peripheral device, the current data indicates a current usage of the peripheral device during the time intervals, and the memory also stores software for controlling the master gaming controller to:

receive a first command to start a first peripheral device of the plurality of peripheral devices, receive a second command to start a second peripheral device of the plurality of peripheral devices, determine, when the first command and the second command are received simultaneously, whether an upper threshold current limit of the power supply will be exceeded by providing power from the power supply to the first peripheral device, the second peripheral device, and any other peripheral devices receiving power from the power supply when the first command and the second command are received, reference priority data for the first peripheral device and the second peripheral device, the priority data specific to the peripheral devices and stored in the current profiles of the peripheral devices, determine which of the first peripheral device and the second peripheral device is a higher priority peripheral device and which is a lower priority peripheral device with respect to each other based on the priority data, start the higher-priority peripheral device when the upper threshold current limit of the power supply will not be exceeded when the higher-priority peripheral device is started, and start the lower-priority peripheral device after the higher-priority device when the upper threshold current limit of the power supply will not be exceeded when the lower-priority peripheral device is started.

2. The multi-station gaming machine of claim 1, wherein the priority data for one or more of the peripheral devices is modifiable via software.

3. The multi-station gaming machine of claim 1, wherein the peripheral device current profiles are downloaded from a host server in a gaming network.

4. The multi-station gaming machine of claim 1, wherein, when the master gaming controller receives a request for a peripheral of the plurality of peripherals to perform a task that would cause the power supply to exceed the upper threshold current limit, the master gaming controller sends a command to the peripheral instructing the peripheral to enter a wait state.

5. The multi-station gaming machine of claim 1, further comprising a control line from the master gaming controller to the plurality of peripheral devices for enabling and disabling a peripheral device.

6. The multi-station gaming machine of claim 1, further comprising a power regulation logic module for controlling commands from the master gaming controller to the one or more peripheral devices.

7. The multi-station gaming machine of claim 1, wherein the memory further stores self-profiling software executable by the master gaming controller, the self-profiling software for controlling the master gaming controller to derive the current profile for one of the peripheral devices.

8. The multi-station gaming machine of claim 1, further comprising one or more timers for measuring one or more operational times of the plurality of peripheral devices.

9. A method of controlling electrical current to peripherals in a multi-station gaming machine having a power supply, the method comprising:

receiving a first command to initiate a first operation having a first operating time on a first peripheral in the gaming machine;

receiving a second command to initiate a second operation on a second peripheral having a second operating time in the gaming machine, the second command received simultaneously with the first command;

determining, by examining a first peripheral current profile for the first peripheral and a second peripheral current profile for the second peripheral, that initiating the first operation on the first peripheral and the second operation on the second peripheral simultaneously will cause an upper threshold current limit of the power supply at a time that the first command and the second command are received to be exceeded;

referencing priority data for the first peripheral and the second peripheral, the priority data specific to the peripherals and the priority data for the first peripheral stored in the first peripheral current profile and the priority data for the second peripheral stored in the second peripheral current profile;

determining which of the first peripheral device and the second peripheral device is a higher priority peripheral device and which is a lower priority peripheral device with respect to each other based on the priority data;

determining which of the first operation and the second operation is a higher priority operation and which is a lower priority operation based on the priorities of the first peripheral device and the second peripheral device;

initiating the higher-priority operation on the higher-priority peripheral device at a time when the upper threshold current limit of the power supply will not be exceeded due to the initiation of the higher-priority operation on the higher-priority peripheral device; and initiating the lower-priority operation on the lower-priority peripheral device at a time after the higher-priority operation is initiated and at a time when the upper threshold current limit of the power supply will not be exceeded due to initiation of the lower-priority operation on the lower-priority peripheral device.

10. The method of claim 9, further comprising storing, in a memory:

a first start time of the first operation, and a second start time of the second operation.

11. The method of claim 9, wherein the first current profile and the second current profile are stored in local memory in the gaming machine.

12. The method of claim 11, wherein local memory includes CPU-addressable memory.

13. The method of claim 9, further comprising downloading the first current profile from a host server in a gaming network.

14. The method of claim 9, further comprising downloading the second current profile from a host server in a gaming network.

15. The method of claim 9, further comprising downloading the first current profile from the first peripheral.

16. The method of claim 9, further comprising downloading the second current profile from the second peripheral.

17. The method of claim 9, further comprising deriving the first current profile and the second current profile by performing a profiling operation on the first peripheral and on the second peripheral.

18. The method of claim 9, further comprising changing the priority of the first peripheral or the second peripheral via software.

19. The method of claim 9, wherein the determining that initiating the first operation on the first peripheral and the second operation on the second peripheral simultaneously will cause the upper threshold current limit of the power supply at the time that the first command and the second command are received to be exceeded further comprises examining task-level electrical requirements, wherein at least one of the first operation and the second operation is comprised of tasks.

20. The method of claim 9, wherein the multi-station gaming machine is a gaming table having a plurality of peripherals, the plurality of peripherals including the first peripheral and the second peripheral.

21. The method of claim 9, wherein the upper threshold current limit of the power supply is determined using efficiency data of the power supply.

22. The method of claim 9, wherein the first peripheral current profile and the second peripheral current profile include time data and current data.

23. The method of claim 22, wherein the time data and the current data are arranged based on peripheral type.

24. The method of claim 22, wherein the time data and the current data are arranged based on manufacturer.

25. A multi-station gaming machine having a power supply, the gaming machine comprising:

means for receiving a first command to initiate a first operation having a first operating time on a first peripheral in the gaming machine;

means for receiving a second command to initiate a second operation on a second peripheral having a second operating time in the gaming machine, means for determining, by examining a first peripheral current profile for the first peripheral and a second peripheral current profile for the second peripheral, that initiating the first operation on the first peripheral and the second operation on the second peripheral simultaneously will cause an upper threshold current limit of the power supply at a time that the first command and the second command are received to be exceeded;

means for referencing priority data for the first peripheral and the second peripheral, the priority data specific to the peripherals and the priority data for the first peripheral stored in the first peripheral current profile and the priority data for the second peripheral stored in the second peripheral current profile;

means for determining which of the first peripheral device and the second peripheral device is a higher priority peripheral device and which is a lower priority peripheral device with respect to each other based on the priority data;

means for determining which of the first operation and the second operation is a higher priority operation and which is a lower priority operation based on the priorities of the first peripheral device and the second peripheral device;

means initiating the higher-priority operation on the higher-priority peripheral device at a time when the upper threshold current limit of the power supply will not be exceeded due to the initiation of the higher-priority operation on the higher-priority peripheral device; and means for initiating the lower-priority operation on the lower-priority peripheral device at a time after the higher-priority operation is initiated and at a time when the upper threshold current limit of the power supply will not be exceeded due to initiation of the lower-priority operation on the lower-priority peripheral device.

26. The multi-station gaming machine as recited in claim 25, wherein the first current profile and the second current profile are stored in local memory in the gaming machine.

27. The multi-station gaming machine of claim 25, wherein the first current profile and the second current profile are derived by performing a profiling operation on the first peripheral and on the second peripheral.

28. The multi-station gaming machine of claim 25, wherein the means for determining that initiating the first operation on the first peripheral and the second operation on the second peripheral simultaneously will cause an upper threshold current limit of the power supply at the time that the first command and the second command are received to be exceeded further comprises means for examining task-level electrical requirements, wherein at least one of the first operation and the second operation is comprised of tasks.

* * * * *